United States Patent
Engineer

(10) Patent No.: US 8,151,761 B2
(45) Date of Patent: Apr. 10, 2012

(54) INTEGRATED INTAKE VALVE AND FUEL INJECTOR FOR VEHICLE ENGINE

(75) Inventor: Nayan Engineer, Canton, MI (US)

(73) Assignees: Hyundai Motor Company, Seoul (KR); Kia Motors Corporation, Seoul (KR); Hyundai America Technical Center, Inc., Superior Township, MI (US)

( * ) Notice: Subject to any disclaimer, the term of this patent is extended or adjusted under 35 U.S.C. 154(b) by 295 days.

(21) Appl. No.: 12/403,574

(22) Filed: Mar. 13, 2009

(65) Prior Publication Data

US 2010/0229826 A1 Sep. 16, 2010

(51) Int. Cl.
*F02M 57/04* (2006.01)

(52) U.S. Cl. ........................................................ 123/296

(58) Field of Classification Search .................... 123/296
See application file for complete search history.

(56) References Cited

U.S. PATENT DOCUMENTS

| | | | | |
|---|---|---|---|---|
| 3,704,694 A | * | 12/1972 | Gilewski et al. | 123/296 |
| 3,812,829 A | * | 5/1974 | McCormick | 123/296 |
| 4,058,091 A | * | 11/1977 | Tanahashi | 123/261 |
| 4,640,237 A | * | 2/1987 | Schaich | 123/79 C |
| 5,957,106 A | * | 9/1999 | Maloney et al. | 123/296 |
| 6,443,121 B1 | * | 9/2002 | Carroll et al. | 123/296 |
| 2001/0054410 A1 | * | 12/2001 | Milam | 123/296 |

FOREIGN PATENT DOCUMENTS

| | | |
|---|---|---|
| JP | 52-089706 A | 7/1977 |
| JP | 09112281 | 4/1997 |
| KR | 1020020051618 A | 6/2002 |

* cited by examiner

*Primary Examiner* — Erick Solis
(74) *Attorney, Agent, or Firm* — Edwards Wildman Palmer LLP; Peter F. Corless

(57) ABSTRACT

A vehicle engine with integrated intake valve and fuel injector is provided. An intake valve is housed in an intake valve body which is provided with a valve seat face. A fuel passage is positioned at the valve seat face toward a spark plug. Further, a valve stem is disposed at the intake valve at a position above the valve seat. The valve stem can be in fluid communication with an intake valve guide and a high pressure tube. With the integrated intake valve and fuel injector, e.g., high level of charge homogeneity can be achieved in a simple manner.

22 Claims, 5 Drawing Sheets

INTEGRATED INTAKE VALVE AND FUEL INJECTOR FOR VEHICLE ENGINE

TECHNICAL FIELD

The present disclosure relates to a fuel injection system for a direct injection type internal combustion engine in which an intake valve and a fuel injector are integrated.

BACKGROUND ART

Intensive researches have been made to improve the efficiency and performance of internal combustion engines for vehicles. Modern direct injection type engines include a spark plug, multiple valves, and a fuel injector located inside the combustion chamber so that the fuel is injected into the cylinder directly, as disclosed in Korean Patent Application Publication No. 1997-112281 and Japanese Patent Application Publication No. 2002-51618. In most of the modern direct injection type engines, an engine computer calculates a timing and an amount of fuel (or fuel/air mixture) to be injected to the combustion chamber on the basis of sensed operating conditions and parameters.

One of the obstacles in providing higher efficiency and performance vehicle engines is spatial limitations for the multiple valves, fuel injector and spark plug.

The above information disclosed in this Background section is only for enhancement of understanding of the background of the invention and therefore it may contain information that does not form the prior art that is already known in this country to a person of ordinary skill in the art.

SUMMARY

In one aspect, the present invention provides a vehicle engine comprising a cylinder, a spark plug, an intake port, an intake valve body, and a hollow intake valve. The cylinder defines therein a combustion chamber and defines thereon a valve seat. A spark plug is disposed at the cylinder near the valve seat. The intake port is connected to the cylinder to be in fluid communication with the combustion chamber. The intake valve body is provided within the intake port and includes at one end portion thereof a valve seat face being inclined corresponding to the valve seat and having an opening thereon. The hollow intake valve is housed in the intake valve body and is provided with an outlet extending to the opening of the valve seat face. Preferably, the outlet may be designed to extend in a predetermined length toward the spark plug.

Preferably, the opening of the valve seat face is provided with at least one nozzle. Suitably, orientation of the nozzle or nozzles is adjustable with respect to the position of the spark plug.

In a preferred embodiment, the vehicle engine may further comprise a valve stem, an intake valve guide and a high pressure tube. The valve stem is disposed at the hollow intake valve at a position above the end portion where the valve seat face is disposed. The intake valve guide is configured to be able to become in fluid communication with the valve stem. The high pressure tube is connected directly or indirectly to a fuel reservoir and is configured to be able to become in fluid communication with the intake valve guide. A preferred example of the high pressure tube is a common rail type high pressure tube. Fuel from the fuel reservoir is injected to the combustion chamber via the opening of the valve seat face when the valve stem, the intake valve guide and the high pressure tube are in fluid communication.

Suitably, the intake valve body is moveable between a valve closure position at which the valve seat comes in contact to the valve seat face, a low lift position at which the valve seat is away from the valve seat face by a first predetermined distance, an intermediate lift position at which the valve seat is away from the valve seat face by a second predetermined distance longer than the first predetermined distance, and a high lift position at which the valve seat is away from the valve seat face by a third predetermined distance longer than the second predetermined distance. In case the intake valve body is in the valve closure position, positive fuel shut-off occurs regardless of whether the valve stem, the intake valve guide and the high pressure tube are in fluid communication. In case the intake valve body is in the low lift position, the valve stem, the intake valve guide and the high pressure tube are not in fluid communication resulting in no fuel injection. In case the intake valve body is in the intermediate lift position, the valve stem, the intake valve guide and the high pressure tube are in fluid communication resulting in split fuel injection. In case the intake valve body is in the high lift position, the valve stem, the intake valve guide and the high pressure tube are in fluid communication resulting in main fuel injection.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
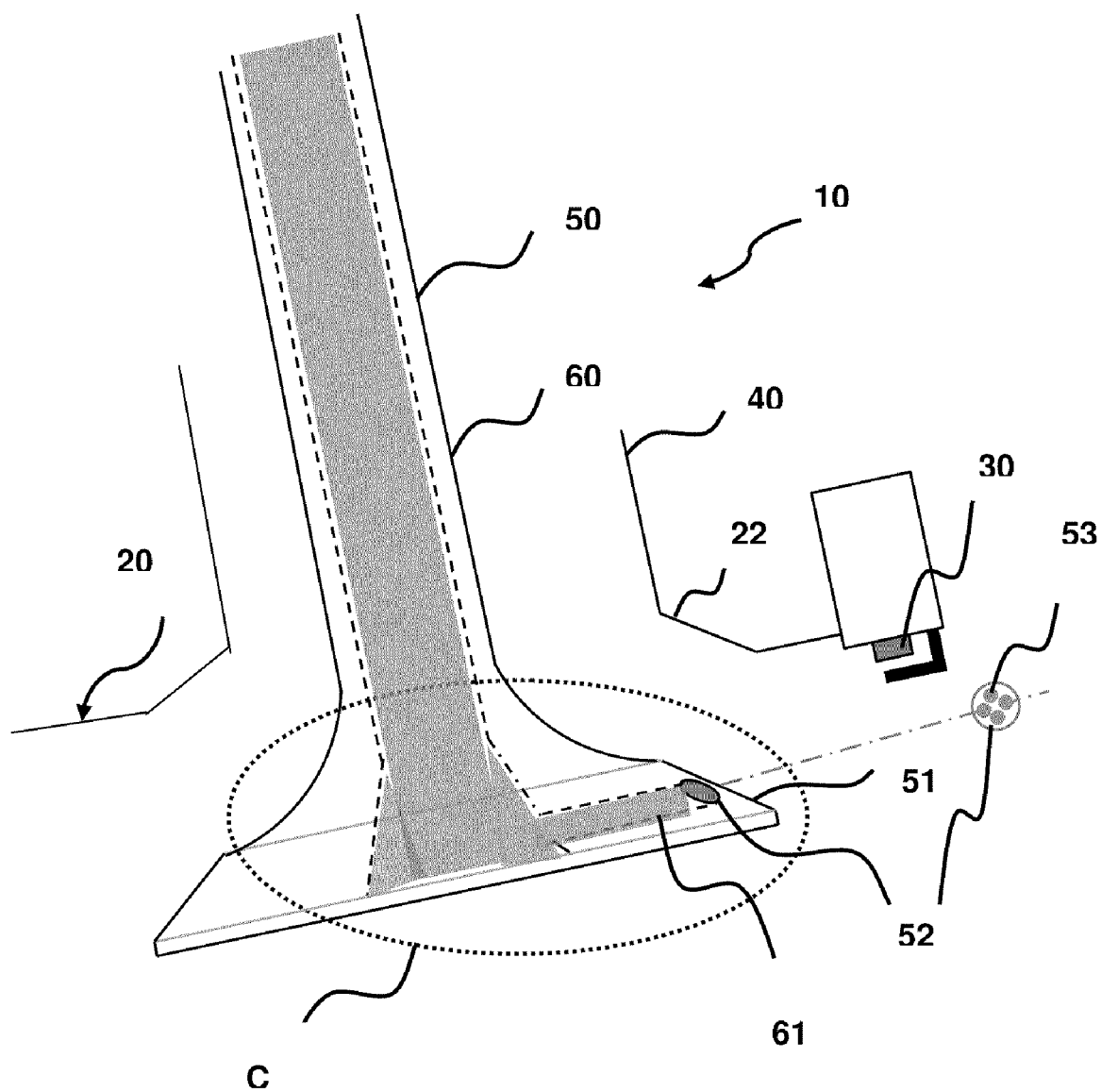
FIG. 1 is a cross-sectional view of a vehicle engine according to an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

Reference will now be made in detail to the preferred embodiments of the present invention, examples of which are illustrated in the drawings attached hereinafter. The embodiments are described below so as to explain the present invention by referring to the figures.

FIG. 1 is a cross-sectional view of a vehicle engine according to an embodiment of the present invention. Referring to FIG. 1, the vehicle engine (10) includes a cylinder (20), a spark plug (30), an intake port (40), an intake valve body (50) and a hollow intake valve (60).

The cylinder defines therein a combustion chamber (21) and defines thereon a valve seat (22). The spark plug (30) is disposed at the cylinder near the valve seat (22). The intake port (40) is connected to the cylinder (20) to be in fluid communication with the combustion chamber (21). The intake valve body (50) is provided within the intake port (40) and includes at one end portion thereof a valve seat face (51). The valve seat face (51) is inclined so as to correspond to the valve seat (22) and has an opening (52) thereon. The hollow intake valve (60) is housed in the intake valve body (50) and is provided with an outlet (61) extending to the opening (52) of the valve seat face (51).

Figure 2:
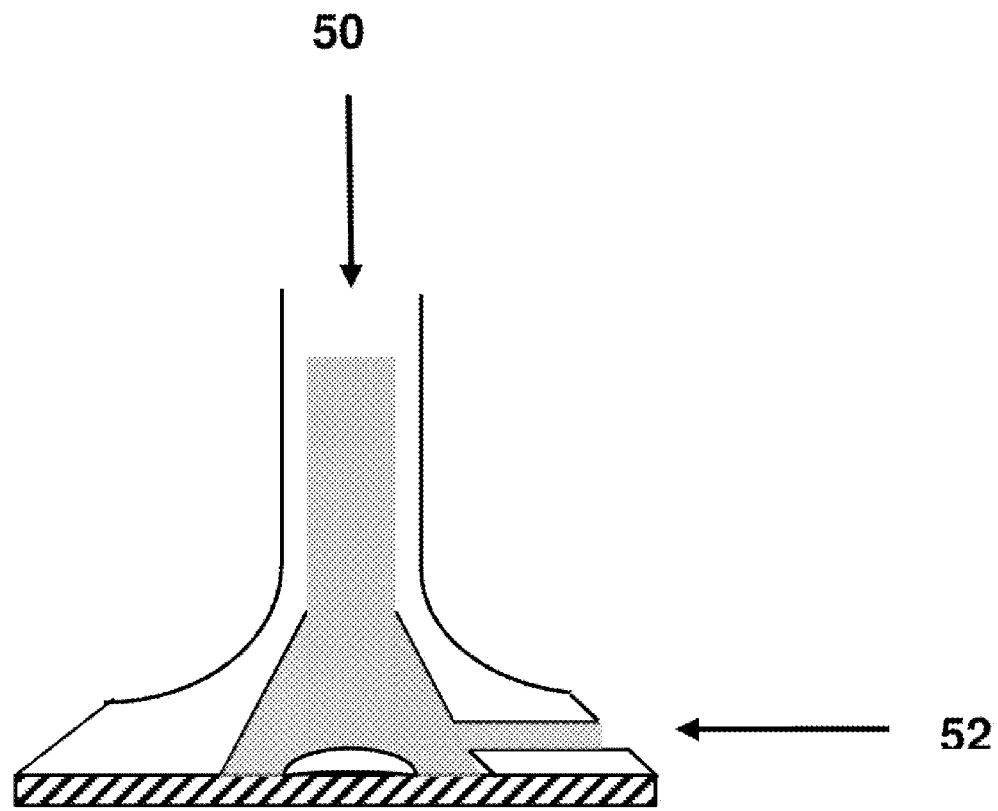
FIG. 2 is an enlarged view of the section shown in a dashed circle "C" of FIG. 1.

FIG. 2 is an enlarged view of the section shown in a dashed circle "C" of FIG. 1. As shown in FIG. 2, the opening (52) provided at the valve seat face (51) of the intake valve body (50) is in communication with the hollow intake valve (60) via the outlet (61). The outlet of the hollow intake valve is positioned along the bottom surface of the intake valve body (50) toward the spark plug (30). That is, it is positioned to be in parallel or substantially parallel with the bottom surface of the intake valve body (50).

Figure 3:
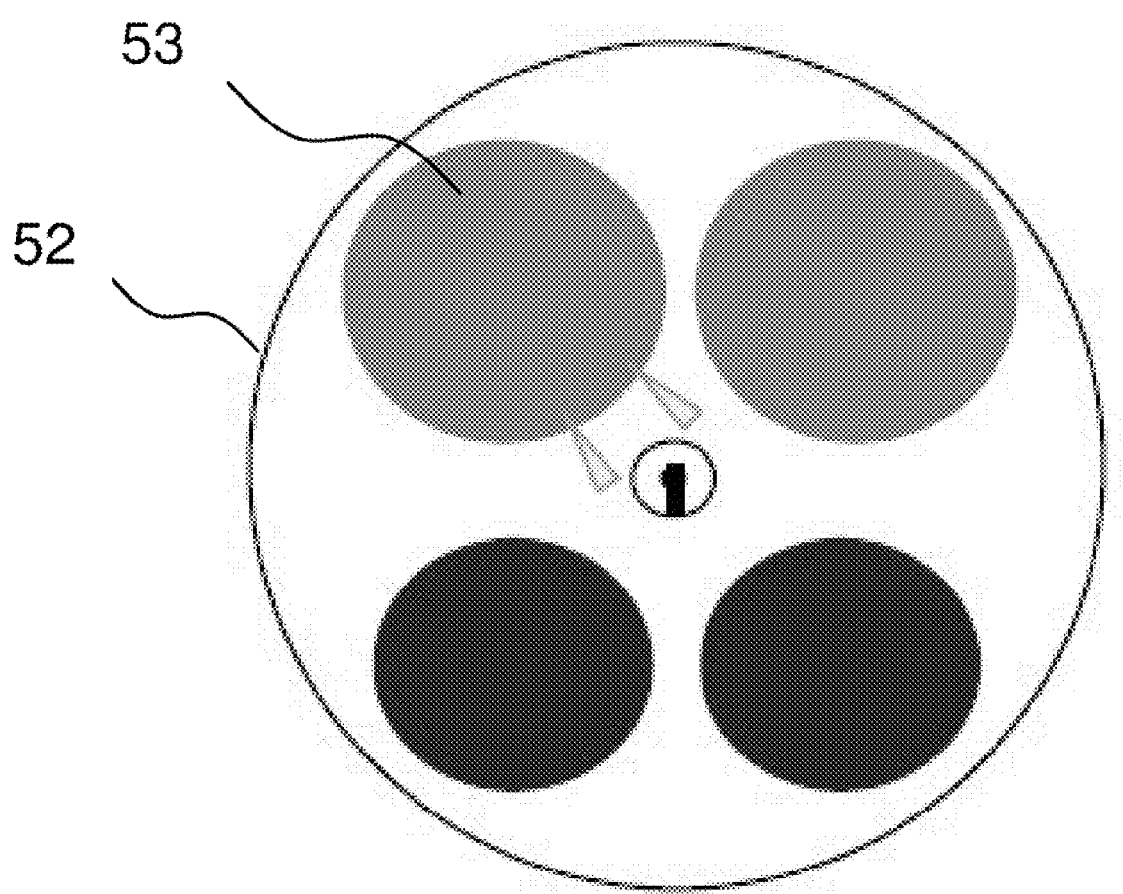
FIG. 3 is an enlarged view of an opening of the valve seat face of the vehicle engine according to an embodiment of the present invention.

Preferably, the opening (52) of the valve seat face (51) may have at least one nozzle (53). As shown in FIG. 3, for example, it may have two nozzles. The nozzle or nozzles can be designed to have a predetermined shape and size depending on the requirements in a particular situation. Also, the nozzle or nozzles can be designed to have a predetermined orientation angle with respect to the spark plug depending on design requirements. With this, fuel distribution passages can breakout at the valve seat area where the incoming fresh air thoroughly mixes to form a homogeneous fuel/air charge. Depending on the design of the nozzle orientation at the valve seat face, additional flexibility for charge distribution can be provided.

Figure 4:
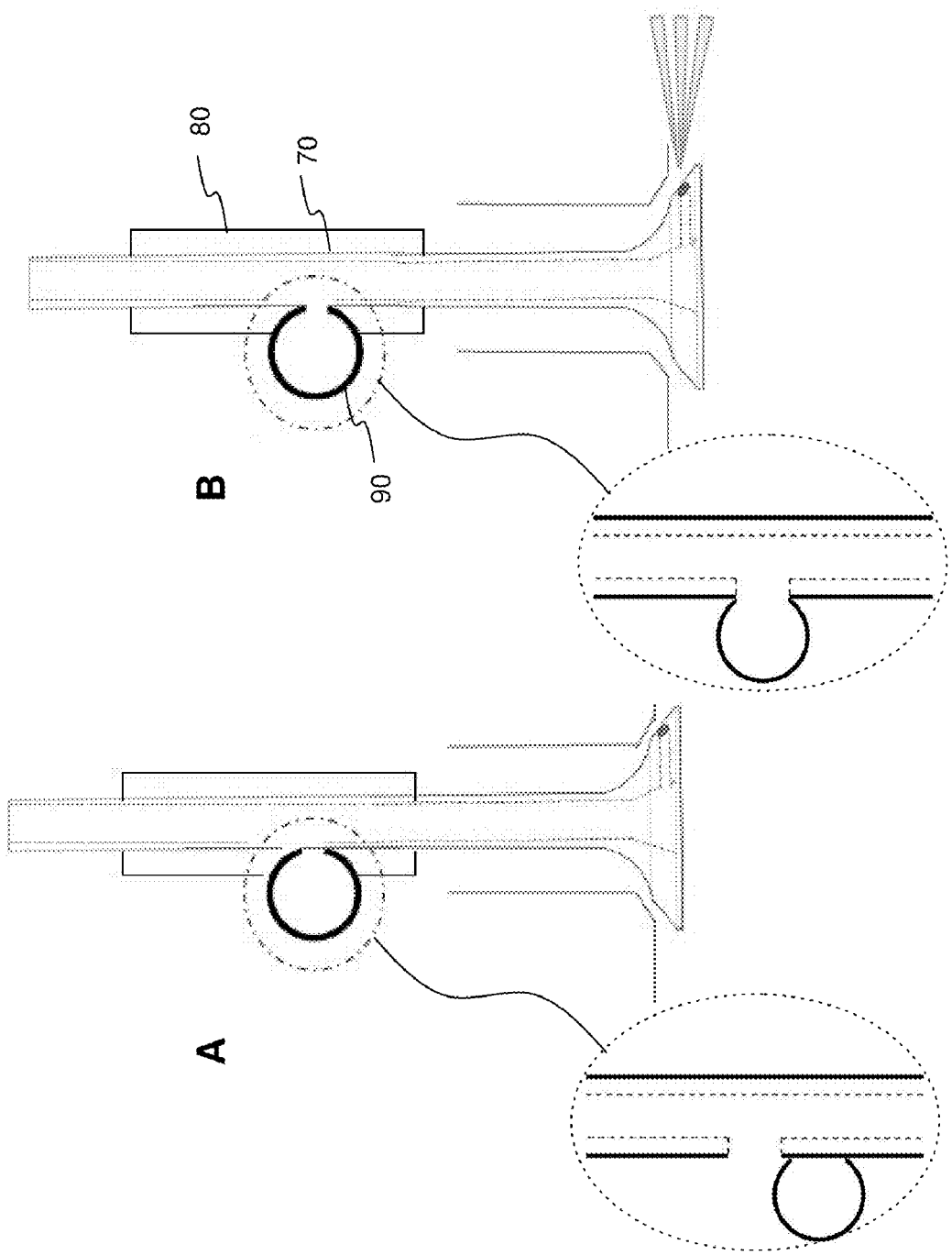
FIGS. 4A and 4B show a valve stem, an intake valve guide and a high pressure tube.

As shown in FIGS. 4A and 4B, in a preferred embodiment, the vehicle engine may further comprise a valve stem (70), an intake valve guide (80) and a high pressure tube (90). The valve stem (70) may be disposed at the hollow intake valve (60) at a position above the end portion where the valve seat face (51) is disposed. The intake valve guide (80) is configured to be able to become in fluid communication with the valve stem (70) and functions to meter fuel to the valve stem (70). The high pressure tube (90), an example of which is a common rail type high pressure tube, is connected directly or indirectly to a fuel reservoir and is configured to be able to become in fluid communication with the intake valve guide (80). Accordingly, fuel from the fuel reservoir can be injected to the combustion chamber (21) via the outlet (61) of the hollow intake valve (60) and the opening (52) of the valve seat face (51) when the valve stem (70), the intake valve guide (80) and the high pressure tube (90) are in fluid communication (e.g., when an opening of the valve stem (70) lines up with an opening of the intake valve guide (80) and an opening of the high pressure tube (90)).

The valve stem (70), the intake valve guide (80), and the high pressure tube (90) can be made in fluid communication by various ways. For example, it can be made by adjustment of the height of the valve stem (70), the intake valve guide (80), and the high pressure tube (90) with respect to each other. Fuel injection timing and pulse width can be controlled by the adjustment of the relative heights thereof. Suitably, fuel injection timing and pulse width can be modulated by adjustment of the height of the intake valve guide (80). An actuator known or to be known in the art can be used for the height adjustment. For example, a controllable hydraulic actuator (not shown in the drawings), which is suitably activated by a solenoid, can be used to move the intake valve guide (80) so that the fuel injection timing and pulse can be controlled according to control of the hydraulic actuator.

As shown in FIGS. 5A to 5D, the intake valve body (50) is moveable between a valve closure position at which the valve seat (22) comes in contact to the valve seat face (51), a low lift position at which the valve seat (22) is away from the valve seat face (51) by a first predetermined distance, an intermediate lift position at which the valve seat (22) is away from the valve seat face (51) by a second predetermined distance longer than the first predetermined distance, and a high lift position at which the valve seat (22) is away from the valve seat face (51) by a third predetermined distance longer than the second predetermined distance. The intake valve body (50) can be moved by an actuator known or to be known in the art.

Figure 5:
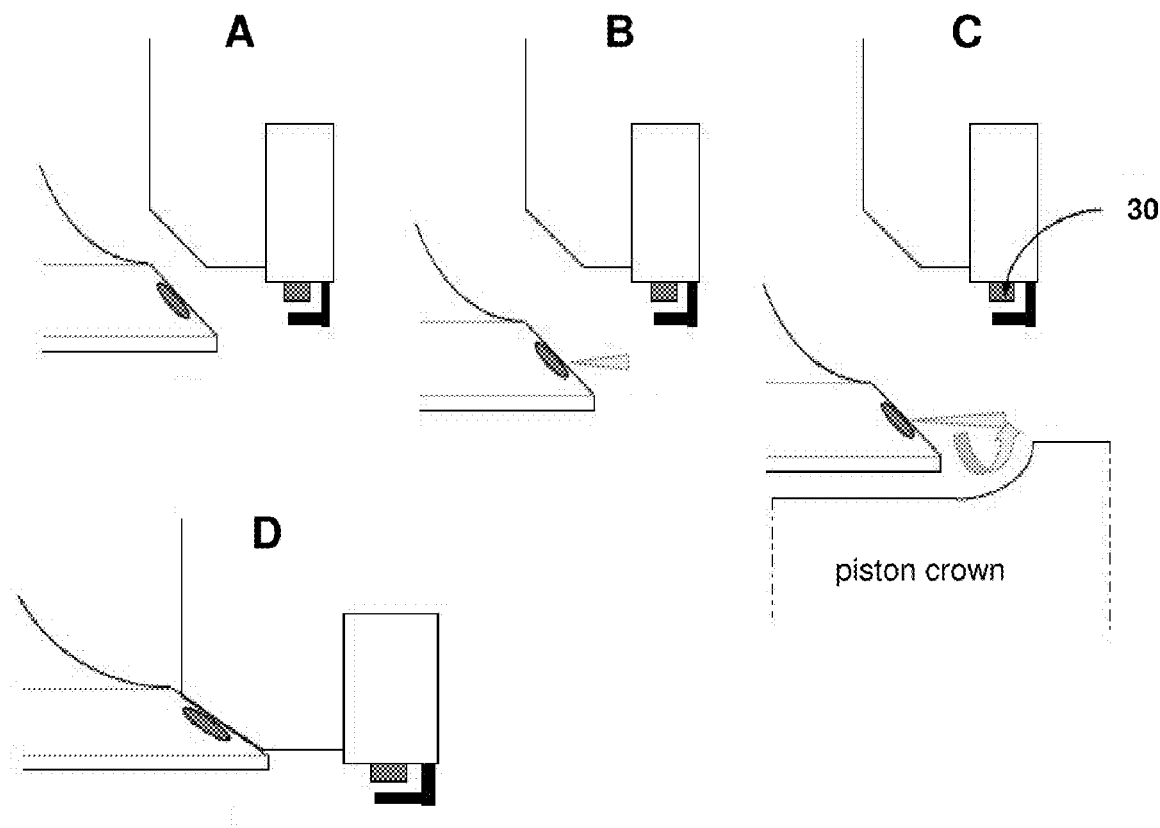
FIGS. 5A to 5D show that the intake valve body of the vehicle engine of FIG. 1 is in a valve closure position, a low lift position, an intermediate lift position and a high lift position, respectively.

In the low lift position, as shown in FIGS. 4A and 5A, the valve stem (70), the intake valve guide (80) and the high pressure tube (90) are not in fluid communication. Accordingly, fuel is not injected in the low lift position, which can prevent wall wetting On the other hand, in the intermediate and high lift positions, as shown in FIGS. 4B, 5B and 5C, the valve stem (70), the intake valve guide (80) and the high pressure tube (90) are in fluid communication. Accordingly, split fuel injection is made in the intermediate lift position and main fuel injection is made in the high lift position. In the high lift position, it is possible to provide stratified charge around the spark plug (30) with the aid of wall guide from the piston crown (FIG. 5C).

In the valve closure position such as when the intake valve body (50) is seated for the subsequent compression and power strokes, as shown in FIG. 5D, positive fuel shut-off occurs regardless of whether the valve stem (70), the intake valve guide (80) and the high pressure tube (90) are in fluid communication, which can prevent liquid fuel drip into the combustion chamber.

As described above, the vehicle engines according to the present invention allow direct fuel injection via an intake valve in a simpler structure and more efficient manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. For instance, those skilled in the art will appreciate that the integrated intake valve with fuel injector according to the present invention can be incorporated into one or more valves of multi valve engines.

The invention claimed is:

1. A vehicle engine (10) comprising:
 a cylinder (20) which defines therein a combustion chamber (21) and defines thereon a valve seat (22);
 a spark plug (30) which is disposed at the cylinder near the valve seat (22);
 an intake port (40) which is connected to the cylinder (20) to be in fluid communication with the combustion chamber;
 an intake valve body (50) which is provided within the intake port and includes at one end portion thereof a valve seat face (51) being inclined corresponding to the valve seat and having an opening (52) thereon;
 a hollow intake valve (60) which is housed in the intake valve body and is provided with an outlet (61) extending to the opening (52) of the valve seat face; and
 wherein said outlet (61) and said opening (52) of the valve seat face are configured and arranged so that fluid passing there through passes without impediment.

2. The vehicle engine of claim 1, wherein flow of fluid through said outlet (61) and said opening (52) of the valve seat face is controlled based on displacement of the hollow intake valve (60) with respect to the valve seat (22).

3. The vehicle engine of claim 1, wherein the opening (52) of the valve seat face is provided with at least one nozzle (53).

4. The vehicle engine of claim 3, wherein orientation of the nozzle or nozzles is adjustable with respect to the position of the spark plug.

5. The vehicle engine of claim 1, further comprising:
 a valve stem (70) which is disposed at the hollow intake valve (60) at a position above the end portion where the valve seat face (51) is disposed;
 an intake valve guide (80) which is configured to be able to become in fluid communication with the valve stem; and
 a high pressure tube (90) which is connected directly or indirectly to a fuel reservoir and is configured to be able to become in fluid communication with the intake valve guide,
 whereby fuel from the fuel reservoir is injected to the combustion chamber (21) via the opening (52) of the valve seat face when the valve stem (70), the intake valve guide (80) and the high pressure tube (90) are in fluid communication.

6. A vehicle engine (10) comprising:
 a cylinder (20) which defines therein a combustion chamber (21) and defines thereon a valve seat (22);
 a spark plug (30) which is disposed at the cylinder near the valve seat (22);
 an intake port (40) which is connected to the cylinder (20) to be in fluid communication with the combustion chamber;
 an intake valve body (50) which is provided within the intake port and includes at one end portion thereof a valve seat face (51) being inclined corresponding to the valve seat and having an opening (52) thereon;
 a hollow intake valve (60) which is housed in the intake valve body and is provided with an outlet (61) extending to the opening (52) of the valve seat face;
 a valve stem (70) which is disposed at the hollow intake valve (60) at a position above the end portion where the valve seat face (51) is disposed;
 an intake valve guide (80) which is configured to be able to become in fluid communication with the valve stem;
 a high pressure tube (90) which is connected directly or indirectly to a fuel reservoir and is configured to be able to become in fluid communication with the intake valve guide,
 whereby fuel from the fuel reservoir is injected to the combustion chamber (21) via the opening (52) of the valve seat face when the valve stem (70), the intake valve guide (80) and the high pressure tube (90) are in fluid communication;
 wherein the intake valve body (50) is moveable between a valve closure position at which the valve seat (22) comes in contact to the valve seat face (51), a low lift position at which the valve seat is away from the valve seat face by a first predetermined distance, an intermediate lift position at which the valve seat is away from the valve seat face by a second predetermined distance longer than the first predetermined distance, and a high lift position at which the valve seat is away from the valve seat face by a third predetermined distance longer than the second predetermined distance; and
 wherein when the intake valve body (50) is in the valve closure position, positive fuel shut-off occurs regardless of whether the valve stem, the intake valve guide and the high pressure tube are in fluid communication.

7. The vehicle engine of claim 6, wherein when the intake valve body (50) is in the low lift position, the valve stem, the intake valve guide and the high pressure tube are not in fluid communication resulting in no fuel injection.

8. The vehicle engine of claim 6, wherein when the intake valve body (50) is in the intermediate lift position, the valve stem, the intake valve guide and the high pressure tube are in fluid communication resulting in split fuel injection.

9. The vehicle engine of claim 6, wherein when the intake valve body (50) is in the high lift position, the valve stem, the intake valve guide and the high pressure tube are in fluid communication resulting in main fuel injection.

10. The vehicle engine of claim 6, wherein said outlet (61) and said opening (52) of the valve seat face are configured and arranged so that fluid passing there through passes without impediment.

11. The vehicle engine of claim 6, wherein flow of fluid through said outlet (61) and said opening (52) of the valve seat face is controlled based on displacement of the hollow intake valve (60) with respect to the valve seat (22).

12. A vehicle engine (10) comprising:
 a cylinder (20) which defines therein a combustion chamber (21) and defines thereon a valve seat (22);
 a spark plug (30) which is disposed at the cylinder near the valve seat;
 an intake port (40) which is connected to the cylinder to be in fluid communication with the combustion chamber;
 an intake valve body (50) which is provided within the intake port and includes at one end portion thereof a valve seat face (51) being inclined corresponding to the valve seat and having an opening (52) thereon;
 a hollow intake valve (60) which is housed in the intake valve body and is provided with an outlet (61) extending in a predetermined length toward the spark plug; and
 wherein said outlet (61) and said opening (52) of the valve seat face are configured and arranged so that fluid passing there through passes without impediment.

13. The vehicle engine of claim 12, wherein flow of fluid through said outlet (61) and said opening (52) of the valve seat face is controlled based on displacement of the hollow intake valve (60) with respect to the valve seat (22).

14. The vehicle engine of claim 12, wherein the opening (52) of the valve seat face is provided with at least one nozzle (53).

15. The vehicle engine of claim 14, wherein orientation of the nozzle or nozzles is adjustable with respect to the position of the spark plug.

16. The vehicle engine of claim 12, further comprising:
- a valve stem (70) which is disposed at the hollow intake valve (60) at a position above the end portion where the valve seat face (51) is disposed;
- an intake valve guide (80) which is configured to be able to become in fluid communication with the valve stem; and
- a high pressure tube (90) which is connected directly or indirectly to a fuel reservoir and is configured to be able to become in fluid communication with the intake valve guide,
- whereby fuel from the fuel reservoir is injected to the combustion chamber (21) via the opening (52) of the valve seat face when the valve stem (70), the intake valve guide (80) and the high pressure tube (90) are in fluid communication.

17. A vehicle engine (10) comprising:
- a cylinder (20) which defines therein a combustion chamber (21) and defines thereon a valve seat (22);
- a spark plug (30) which is disposed at the cylinder near the valve seat;
- an intake port (40) which is connected to the cylinder to be in fluid communication with the combustion chamber;
- an intake valve body (50) which is provided within the intake port and includes at one end portion thereof a valve seat face (51) being inclined corresponding to the valve seat and having an opening (52) thereon;
- a hollow intake valve (60) which is housed in the intake valve body and is provided with an outlet (61) extending in a predetermined length toward the spark plug;
- a valve stem (70) which is disposed at the hollow intake valve (60) at a position above the end portion where the valve seat face (51) is disposed;
- an intake valve guide (80) which is configured to be able to become in fluid communication with the valve stem;
- a high pressure tube (90) which is connected directly or indirectly to a fuel reservoir and is configured to be able to become in fluid communication with the intake valve guide,
- whereby fuel from the fuel reservoir is injected to the combustion chamber (21) via the opening (52) of the valve seat face when the valve stem (70), the intake valve guide (80) and the high pressure tube (90) are in fluid communication;
- wherein the intake valve body (50) is moveable between a valve closure position at which the valve seat (22) comes in contact to the valve seat face (51), a low lift position at which the valve seat is away from the valve seat face by a first predetermined distance, an intermediate lift position at which the valve seat is away from the valve seat face by a second predetermined distance longer than the first predetermined distance, and a high lift position at which the valve seat is away from the valve seat face by a third predetermined distance longer than the second predetermined distance; and
- wherein when the intake valve body (50) is in the valve closure position, positive fuel shut-off occurs regardless of whether the valve stem, the intake valve guide and the high pressure tube are in fluid communication.

18. The vehicle engine of claim 17, wherein when the intake valve body (50) is in the low lift position, the valve stem, the intake valve guide and the high pressure tube are not in fluid communication resulting in no fuel injection.

19. The vehicle engine of claim 17, wherein when the intake valve body (50) is in the intermediate lift position, the valve stem, the intake valve guide and the high pressure tube are in fluid communication resulting in split fuel injection.

20. The vehicle engine of claim 17, wherein when the intake valve body (50) is in the high lift position, the valve stem, the intake valve guide and the high pressure tube are in fluid communication resulting in main fuel injection.

21. The vehicle engine of claim 17, wherein said outlet (61) and said opening (52) of the valve seat face are configured and arranged so that fluid passing there through passes without impediment.

22. The vehicle engine of claim 17, wherein flow of fluid through said outlet (61) and said opening (52) of the valve seat face is controlled based on displacement of the hollow intake valve (60) with respect to the valve seat (22).

* * * * *